(12) United States Patent
Hopkins et al.

(10) Patent No.: US 10,642,812 B1
(45) Date of Patent: May 5, 2020

(54) DATABASE SYSTEM, COMPUTING DEVICE AND METHOD FOR MESSAGE CONSTRUCTION, PROCESSING AND STORAGE DEPENDENT UPON SATISFACTION OF PREDEFINED REQUIREMENTS

(71) Applicant: McKesson Corporation, Irving, TX (US)

(72) Inventors: Stacy Hopkins, Loganville, GA (US); Beth Kaye, Suwanee, GA (US)

(73) Assignee: MCKESSON CORPORATION, Irving, TX (US)

( * ) Notice: Subject to any disclaimer, the term of this patent is extended or adjusted under 35 U.S.C. 154(b) by 353 days.

(21) Appl. No.: 15/468,510

(22) Filed: Mar. 24, 2017

(51) Int. Cl.
　　*G06F 16/00*　　(2019.01)
　　*G06F 16/22*　　(2019.01)
　　*H04L 12/58*　　(2006.01)
　　*H04L 29/08*　　(2006.01)
　　*G06F 16/23*　　(2019.01)

(52) U.S. Cl.
　　CPC ...... *G06F 16/2282* (2019.01); *G06F 16/2365* (2019.01); *H04L 51/04* (2013.01); *H04L 67/1044* (2013.01)

(58) Field of Classification Search
　　CPC . G06F 16/2282; G06F 16/2365; H04L 51/04; H04L 67/1044
　　USPC ...................................................... 707/755
　　See application file for complete search history.

(56) References Cited

U.S. PATENT DOCUMENTS

| 6,463,462 B1* | 10/2002 | Smith | G06Q 10/107 709/206 |
| 10,210,311 B1* | 2/2019 | Taneja | G16H 40/67 |
| 10,468,130 B1* | 11/2019 | Taneja | G16H 10/60 |
| 2004/0225528 A1* | 11/2004 | Brock | G06F 19/3456 705/2 |
| 2007/0203751 A1* | 8/2007 | Koblasz | G16H 10/65 705/2 |
| 2009/0049140 A1* | 2/2009 | Stoddard | G06Q 10/107 709/206 |
| 2010/0100370 A1* | 4/2010 | Khouri | G06Q 10/107 704/9 |
| 2013/0065569 A1* | 3/2013 | Leipzig | G06F 9/453 455/416 |
| 2013/0182277 A1* | 7/2013 | Iguchi | G06K 15/02 358/1.14 |

(Continued)

*Primary Examiner* — Thanh-Ha Dang
(74) *Attorney, Agent, or Firm* — Alston & Bird LLP (57) ABSTRACT

A database system, computing device and method are provided to construct and process messages in a manner dependent upon the satisfaction of predefined requirements. In regards to a method, an electronic message is received and a determination is made as to whether the subject of the electronic message is a member of a group for which the predefined requirements are to be satisfied. If so, the method determines whether the predefined requirements are satisfied with respect to the subject of the electronic message. The method also constructs a related message, causes the related message to be transmitted to a request processor and receives a response from the request processor. The method then constructs a response to the electronic message and, in an instance in which the predefined requirements are not satisfied, causes a notification regarding a failure to satisfy the predefined requirements to also be constructed.

16 Claims, 4 Drawing Sheets

(56) References Cited

U.S. PATENT DOCUMENTS

2017/0034087 A1* 2/2017 Borenstein .............. H04L 51/08
2017/0324695 A1* 11/2017 Fischer ................... H04L 51/18

* cited by examiner

DATABASE SYSTEM, COMPUTING DEVICE AND METHOD FOR MESSAGE CONSTRUCTION, PROCESSING AND STORAGE DEPENDENT UPON SATISFACTION OF PREDEFINED REQUIREMENTS

TECHNICAL FIELD

An example embodiment of the present invention relates generally to the construction, processing and storage of messages and, more particularly, to the construction, processing and storage of a message in a manner that is dependent upon the satisfaction of predefined requirements with respect to the subject of the message.

BACKGROUND

Messages are frequently transmitted from a source to a recipient for a variety of different purposes. For example, the message may convey a request that is received by the recipient and for which a response is subsequently formulated by the recipient in order to convey the requested information to the source.

In some cases, use of the requested information may be conditioned upon the satisfaction of one or more additional requirements. Thus, although the source may receive the requested information, further action based upon the requested information may be limited or prevented in some instances if additional requirements associated with the subject of the message have not been satisfied. While the satisfaction of these additional requirements in advance may permit the source to make use of the requested information in the desired fashion and in a timely manner, the failure to have satisfied the additional requirement in advance of the provision of the requested information may frustrate the purpose for which the requested information was conveyed to the source. While the source may then take steps to satisfy the additional requirements, the use of the requested information will at a minimum be delayed and will correspondingly decrease the efficiency with which information is received and then utilized by the source.

BRIEF SUMMARY

A database system, computing device, method and computer program product are provided in accordance with an example embodiment in order to construct, process and store messages in a manner dependent upon the satisfaction of predefined requirements, such as predefined requirements associated with the subject of the message. In an instance in which the predefined requirements have not been satisfied, the response that is constructed may also include a notification regarding the failure to satisfy the predefined requirements. As such, action can be taken in a timely and efficient manner in order to complete the predefined requirements, thereby permitting the response to be acted upon.

A database system is provided in accordance with an example embodiment that includes one or more data storage devices and a database controller configured to store messages in respective tables defined within the one or more data storage devices. The database controller is configured to store in a first table electronic messages that are received via a communication interface. The database controller is configured to store in a second table related messages transmitted by the communication interface to a request processor. Each related message is based upon information provided by a respective electronic message. The database controller is configured to store in a third table responses from the request processor to the related messages. The database controller is configured to store in a fourth table responses to the electronic messages that are based upon the responses from the request processor and that are transmitted by the communication interface. In addition, the database controller is configured to store in a fifth table notifications transmitted by the communication interface in association with respective responses to the electronic messages, each notification identifying an instance in which: (i) a subject of a respective electronic message is a member of a group for which predefined requirements are to be satisfied and (ii) a failure to satisfy the predefined requirements has been determined. For example, one or more of the notifications stored by the database controller in the fifth table may include information regarding compliance measures to be taken to satisfy the predefined requirements.

A computing device is provided in accordance with an example embodiment that is configured to analyze an electronic message and to determine whether predefined requirements are satisfied with respect to a subject of the electronic message. The computing device includes a communication interface configured to receive the electronic message. The computing device also includes group determination circuitry configured to analyze a field of the electronic message to determine whether the subject of the electronic message is a member of a group for which the predefined requirements are to be satisfied. The computing device also includes requirement determination circuitry configured to determine, in an instance in which the subject of the electronic message is a member of a group for which the predefined requirements are to be satisfied, whether the predefined requirements are satisfied with respect to the subject of the electronic message. The computing device further includes related message construction circuitry configured to construct a related message based upon information provided by the electronic message for transmission by the communication interface to a request processor. The computing device also includes response construction circuitry configured to construct, based upon a response from the request processor, a response to the electronic message that is to be transmitted by the communication interface and, in an instance in which the predefined requirements are not satisfied, to cause notification regarding a failure to satisfy the predefined requirements to also be constructed for transmission by the communication interface in association with the response. The computing device further includes a database configured to store one or more of the electronic message, the related message, the response from the request processor, the response to the electronic message or the notification regarding the failure to satisfy the predefined requirements.

The group determination circuitry of an example embodiment is configured to determine whether the subject of the electronic message is a member of a group for which the predefined requirements are to be satisfied by determining a normalized name for the subject of the electronic message. One or more items including the subject of the electronic message are associated with the normalized name. The group determination circuitry of this example embodiment is further configured to determine whether the subject of the electronic message is a member of a group for which the predefined requirements are to be satisfied by identifying the corresponding item that is associated with the normalized name based upon historical data. The group determination circuitry is further configured to determine whether the subject of the electronic message is a member of a group for which the predefined requirements are to be satisfied by determining whether the corresponding item that is associated with the normalized name based upon historical data is a member of a group for which the predefined requirements are to be satisfied.

In an instance in which the electronic message does not identify a source of the corresponding item, the group determination circuitry is further configured to randomly identify the source from among sources that satisfy the predefined requirements. The communication interface of an example embodiment is further configured to cause a response to the electronic message and a notification to be transmitted to a source of the electronic message, which is distinct from the source of the corresponding item. In an example embodiment, the response construction circuitry is configured to cause a notification regarding a failure to satisfy the predefined requirements to also be constructed by including information within the notification regarding compliance measures to be taken to satisfy the predefined requirements.

In another embodiment, a method is provided for analyzing an electronic message and determining whether predefined requirements are satisfied with respect to the subject of the electronic message. The method includes receiving the electronic message via a communication interface and analyzing, with group determination circuitry, a field of the electronic message to determine whether the subject of the electronic messages is a member of a group for which the predefined requirements are to be satisfied. In an instance in which the subject of the electronic message is a member of a group for which the predefined requirements are to be satisfied, the method additionally determines, with requirements determination circuitry, whether the predefined requirements are satisfied with respect to the subject of the electronic message. The method also constructs, with related message construction circuitry, a related message based upon information provided by the electronic message, causes the related message to be transmitted by the communication interface to a request processor and, based upon the related message, receives a response via the communication interface from the request processor. Based upon the response from the request processor, the method constructs, with response construction circuitry, a response to the electronic message that is to be transmitted by the communication interface and, in an instance in which the predefined requirements are not satisfied, causes a notification regarding a failure to satisfy the predefined requirements to also be constructed for transmission by the communication interface in association with the response. The method further includes storing, in a database, one or more of the electronic message, the related message, the response from the request processor, the response to the electronic message or the notification regarding the failure to satisfy the predefined requirements.

The method of an example embodiment determines, with the group determination circuitry, whether the subject of the electronic message is a member of a group for which the predefined requirements are to be satisfied by determining, with the group determination circuitry, a normalized name for the subject of the electronic message. One or more items including the subject of the electronic message are associated with the normalized name. In this example embodiment, the method determines, with the group determination circuitry, whether the subject of the electronic message is a member of a group from which the predefined requirements are to be satisfied by identifying, with the group determination circuitry, the corresponding item that is associated with a normalized name based upon historical data. In this regard, the method determines, with the group determination circuitry, whether the subject of the electronic message is a member of a group for which the predefined requirements are to be satisfied by determining, with the group determination circuitry, whether the corresponding item associated with the normalized name based upon historical data is a member of a group for which the predefined requirements are to be satisfied. The method of an example embodiment further includes, in an instance in which the electronic message does not identify a source of the corresponding item, randomly identifying, with the group determination circuitry, the source from among sources that satisfy the predefined requirements. The method of this example embodiment also includes causing the response to the electronic message and a notification be transmitted by the communication interface to a source of the electronic message, which is distinct from the source of the corresponding item. The method of an example embodiment causes a notification regarding a failure to satisfy the predefined requirements to also be constructed by the response construction circuitry by including information within the notification regarding compliance measures to be taken to satisfy the predefined requirements.

In a further example embodiment, a computer program product is provided that is configured to analyze an electronic message and to determine whether predefined requirements are satisfied with respect to a subject of the electronic message. The computer program product includes a non-transitory computer readable medium having program code stored therein with the program code including program code instructions configured, upon execution, to receive the electronic message and to determine whether the subject of the electronic message is a member of a group for which the predefined requirements are to be satisfied and, in an instance in which the subject of the electronic message is a member of a group for which the predefined requirements are to be satisfied, to determine whether the predefined requirements are satisfied with respect to the subject of the electronic message. The program code also includes program code instructions configured, upon execution, to construct a related message based upon information provided by the electronic message, to cause a related message to be transmitted to a request processor and, based upon the related message, to receive a response from the request processor. The program code additionally includes program code instructions configured, upon execution, to construct the response to the electronic message based upon the response from the request processor that is to be transmitted and, in an instance in which the predefined requirements are not satisfied, to cause a notification regarding a failure to satisfy the predefined requirements to also be constructed for transmission in association with the response. The program code additionally includes program code instructions configured, upon execution, to store one or more of the electronic message, the related message, the response from the request processor, the response to the electronic message or the notification regarding a failure to satisfy the predefined requirements.

The program code instructions configured to determine whether the subject of the electronic message is a member of a group for which the predefined requirements are to be satisfied include, in one embodiment, program code instructions configured to determine a normalized name for the subject of the electronic message. One or more items including the subject of the electronic message are associated with the normalized name. In this example embodiment, the program code instructions configured to determine whether the subject of the electronic message is a member of a group for which the predefined requirements are to be satisfied include program code instructions configured to identify the corresponding item that is associated with a normalized name based upon historical data. In this example embodiment, the program code instructions configured to determine whether the subject of the electronic message is a member of a group for which the predefined requirements are to be satisfied also include program code instructions configured to determine whether the corresponding item that is associated with the normalized name based upon historical data is a member of a group for which the predefined requirements are to be satisfied. In an instance in which the electronic message does not identify a source of the corresponding item, the program code of an example embodiment additionally includes program code instructions configured to randomly identify the source from among sources that satisfy the predefined requirements. In this example embodiment, the program code further includes program code instructions configured to cause a response to the electronic message and the notification to be transmitted to a source of the electronic message, which is distinct from the source of the corresponding item.

BRIEF DESCRIPTION OF THE DRAWINGS

Having thus described certain example embodiments of the present invention in general terms, reference will hereinafter be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A database system, computing device, method and computer program product are provided in accordance with an example embodiment in order to analyze an electronic message and to determine whether predefined requirements are satisfied with respect to a subject of the electronic message. In this regard, the subject of the electronic message may be a member of a group for which predefined requirements are to be satisfied, such as prior to being permitted to act upon the response to the electronic message that is otherwise constructed and provided. In an instance in which the predefined requirements are not satisfied, the computing device, method and computer program product of an example embodiment may provide a notification regarding the failure to satisfy the predefined requirements and, in some embodiments, may provide information regarding compliance measures to be taken to satisfy the predefined requirements. Thus, the notification provides an alert as to the predefined requirements that remain to be satisfied in order to permit the response that is provided to the electronic message to be acted upon.

By providing the notification, an opportunity is provided to satisfy the predefined requirements in a manner that permits the response to the electronic message to be acted upon in a timely and efficient manner and without frustrating the purpose of the message exchange. Additionally, the satisfaction of the predefined requirements in response to the notification may also avoid inefficiencies attributable to the generation and processing of messages that may otherwise be created in response to an effort to take action based upon the response to the electronic message in an instance in which the predefined requirements have not been satisfied, thereby avoiding the imposition of additional processing requirements attributable to the generation and processing of the additional messages and correspondingly avoiding further burdening the network with the transmission of these additional messages.

Figure 1:
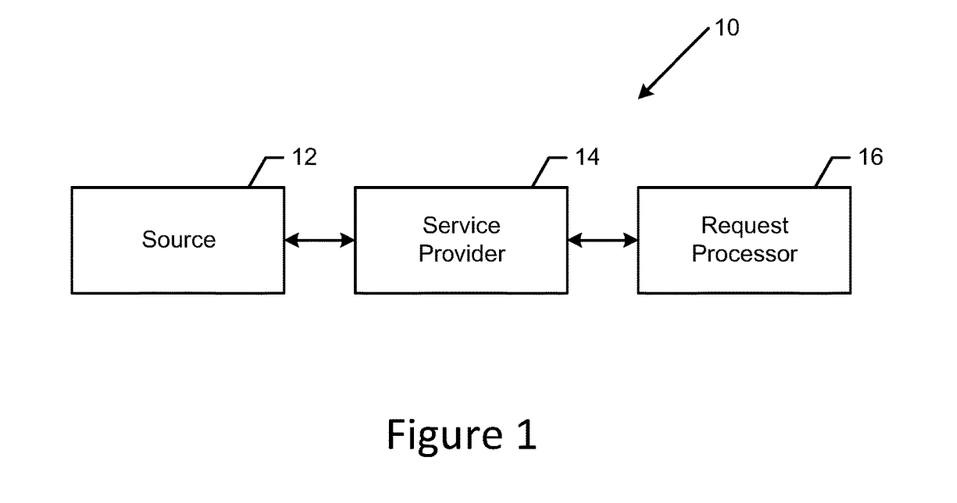
FIG. 1 is a diagram of a system configured to construct and process a message in a manner that is dependent upon the satisfaction of predefined requirements with respect to the subject of the message in accordance with an example embodiment to the present invention.

By way of example, a system 10 that is configured to construct and process a message in a manner that is dependent upon the satisfaction of predefined requirements with respect to the subject of the message is depicted in FIG. 1. As shown, the electronic message may be provided by a source 12 and received by a service provider 14, such as a switch. After receiving the electronic message provided by the source and constructing a related message, the service provider is configured to communicate with a request processor 16. Although the method, computing device and computer program product may be employed in various applications, the method, computing device and computer program product of example embodiments are employed in conjunction with the construction and processing of messages in conjunction with telecommunication applications, content delivery and provisioning and healthcare applications, such as in conjunction with the submission and evaluation of prescription benefit coverage requests, such as a prescription benefit coverage request submitted by a prescriber, and the provision of feedback regarding reimbursement of the patient by a request processor in the form of a pharmacy benefit manager, an insurance company or the like.

Figure 2:
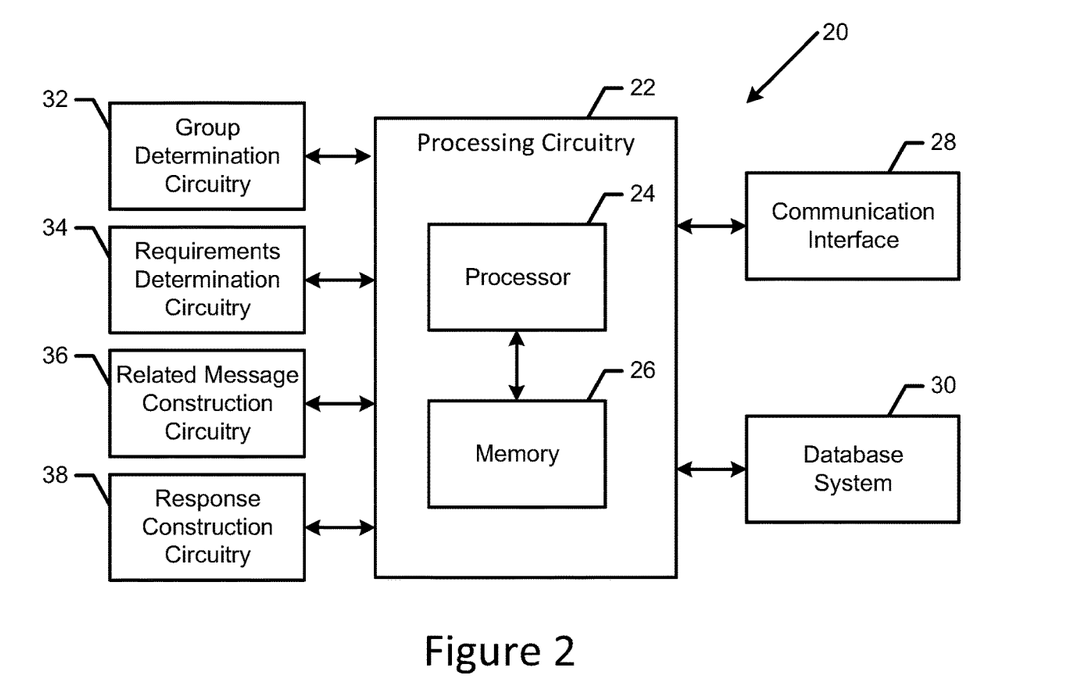
FIG. 2 is a block diagram of the computing device that may be specifically configured in accordance with an example embodiment to the present invention.

The service provider 14 may be configured in various manners, but, in embodiment, the service provider includes a computing device 20 configured to construct and process a message in a manner that is dependent upon the satisfaction of predefined requirements with respect to the subject of the message and may be embodied as shown in FIG. 2. In this regard, the computing device that embodies the service provider may include or otherwise be in communication with a processing system including, for example, processing circuitry 22 that is configurable to perform actions in accordance with example embodiments described herein. The processing circuitry may be configured to perform data processing, application execution and/or other processing and management services. The processing circuitry may include a processor 24 and memory 26 that may be in communication with or otherwise control a communication interface 28 and a database system 30. The computing device may also include the communication interface and the database system as shown in FIG. 2, or the communication interface and/or the database system may be separate from, but in communication with, the computing device.

In an example embodiment, the memory 26 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 24. Additionally or alternatively, the memory could be configured to store instructions for execution by the processor.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein. In some embodiments, the computing device, as well as the processing circuitry, may be distributed with the processing circuitry including a plurality of processors or modules for performing different functions.

As shown in FIG. 2, the computing device 20 may also include several specifically configured types of circuitry configured to perform different functions as described below. In this regard, the computing device of an example embodiment includes group determination circuitry 32, requirements determination circuitry 34, related message construction circuitry 36 and/or response construction circuitry 38. In one embodiment, the processing circuitry 22, such as the processor 24, embodies one or more of the group determination circuitry, requirements determination circuitry, related message construction circuitry and/or response construction circuitry. Alternatively, the group determination circuitry, requirements determination circuitry, related message construction circuitry and/or response construction circuitry may be discrete circuitry, separate from, but in communication with, the processing circuitry. In this alternative embodiment, each of the group determination circuitry, requirements determination circuitry, related message construction circuitry and/or response construction circuitry may be embodied in any of the various manners described above with respect to the processor including embodiments comprised exclusively of hardware or embodiments in which the execution of software by hardware serves to specifically configure the hardware to perform the respective functions.

The communication interface 28 may include one or more interface mechanisms for enabling communication with the request processor 16. In this regard, the communication interface may include, for example, an antenna (or multiple antennas) and supporting hardware and/or software for enabling the communications therewith.

The database system 30 may include any of a variety of data storage devices such as a Network Attached Storage (NAS) device or devices, or as a separate database server or servers. The database system includes information accessed and stored by the processing circuitry 22 to facilitate the operations of the service provider 14. As described below in conjunction with FIG. 5, for example, the database system may comprise a series of tables configured to store information regarding different types of messages and/or portions of different types of messages as described below.

Figure 3:
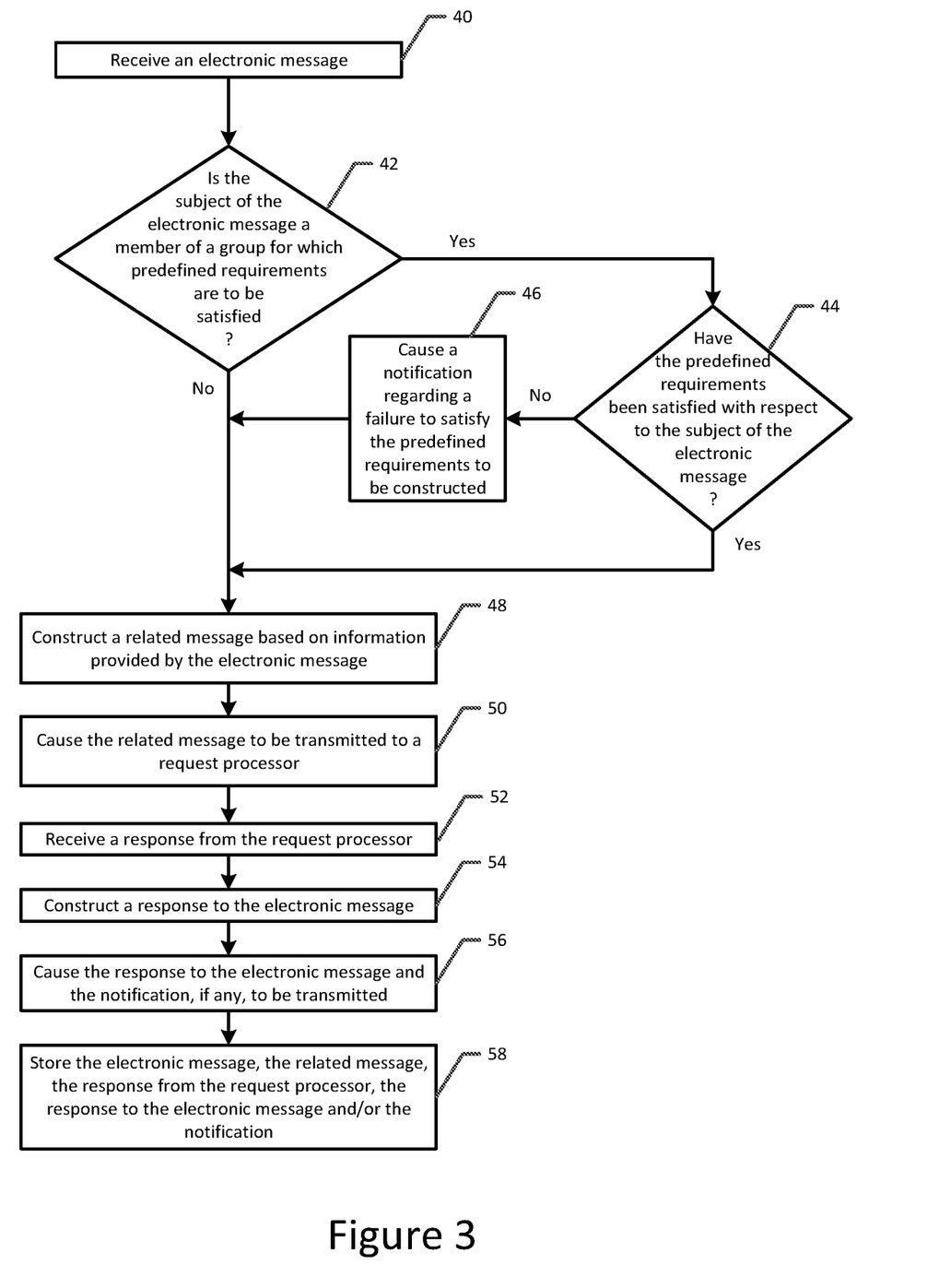
FIG. 3 is a flowchart illustrating the operations performed, such as by the switch of FIG. 1 embodied by the computing device of FIG. 2, in accordance with an example embodiment to the present invention.

The operations performed by the computing device 20 embodied by the service provider 14 are depicted in an example embodiment in FIG. 3. As shown in block 40 of FIG. 3, the computing device includes means, such as the communication interface 28, the processing circuitry 22, the processor 24 or the like, for receiving an electronic message. The electronic message may take many forms depending upon the application. For example, the electronic message may be a message provided in conjunction with a telecommunications application that requests information from a recipient sufficient to permit a telecommunications connection to be established. Alternatively, the electronic message may be a request for content with conjunction with a content delivery and provisioning application. As yet another example, the electronic message may be a prescription benefit coverage request message from a prescriber, e.g., a physician or other healthcare practitioner, of a prescription, from a pharmacy, e.g., a pharmacy management system, or from a patient, such as via a website, portal or other online tool provided by, e.g., a pharmacy, that solicits benefit information associated with a patient such that the prescriber and/or the patient may determine the cost to the patient in advance of the submission of the prescription, thereby increasing the likelihood that the patient will have the prescription filled. Thus, the prescription benefit coverage request message is processed in order to evaluate a patient's prescription coverage in advance of and without the actual prescription having been written or filled.

Regardless of the type of electronic message, the electronic message is generated by source 12. For example, in an embodiment in which the electronic message is a prescription benefit coverage request message, the electronic message may be generated by a system operated or controlled by the prescriber or an intermediary, such as an electronic health records system or the like. In other embodiments, the source, such as the source of the prescription benefit coverage request message may be a pharmacy, e.g., a pharmacy management system, or a patient, such as via a website, portal or other online tool provided by a pharmacy or pharmacy management system, for example. Although the electronic message is intended to eventually elicit a response from a recipient, such as a request processor 16 as described below, the electronic message is received by a service provider 14 that analyzes the electronic message and that, in turn, directs a related message to the particular request processor that is intended to respond to the electronic message.

As shown in block 42 of FIG. 3 and in accordance with an example embodiment, the computing device 20 embodied by the service provider 14 includes means, such as the processing circuitry 22, the processor 24, group determination circuitry 32 or the like, for analyzing a field of the electronic message to determine whether the subject of the electronic message is a member of a group for which predefined requirements are required to be satisfied. The subject of the electronic message may be a member of various types of groups having a variety of different predefined requirements that are to be satisfied depending upon the application. In conjunction with a determination of prescription benefits coverage brought about by a prescription benefit coverage request message, however, the subject of the electronic message may be a medication as defined, for example by a national drug code (NDC) and the group to which the medication may belong may be a risk evaluation and mitigation strategies (REMS) group. In this regard, a REMS group identifies a group of medications for which the risk associated with the prescription thereof is considered to potentially outweigh the benefit in some instances. As such, predefined requirements are associated with the prescription of REMS medications with the predefined requirements needing to be satisfied in advance of providing the medication to the patient. Although various requirements may be predefined, examples of the predefined requirements may include the provision of educational information to the patient and the participation by the prescriber and/or the pharmacy in educational programs related to the prescription of REMS medications. A failure to satisfy the predefined requirements associated with a REMS medication will prevent the pharmacy from providing the medication to the patient until the predefined requirements have been satisfied. As such, in instances in which the predefined requirements relate to action to be taken by the prescriber, a meaningful delay may be introduced in the actual provision of the medication to the patient by the pharmacy while awaiting remedial satisfaction of the predefined requirements by the prescriber.

A determination as to whether the subject of the electronic message, such as the medication identified by a prescription benefit coverage request message, is a member of a group for which predefined requirements are to be satisfied may be performed in various manners. For example, a list of medications as defined by their respective NDCs that are categorized as REMS may be maintained, such as being stored in memory 26, and the processing circuitry 22, e.g., processor 24, or the group determination circuitry 32 may be configured to compare the medication that is the subject of the prescription benefit coverage request message with the list of medications categorized as REMS in order to determine whether the medication that is the subject of the electronic message is a member of the REMS group.

Figure 4:
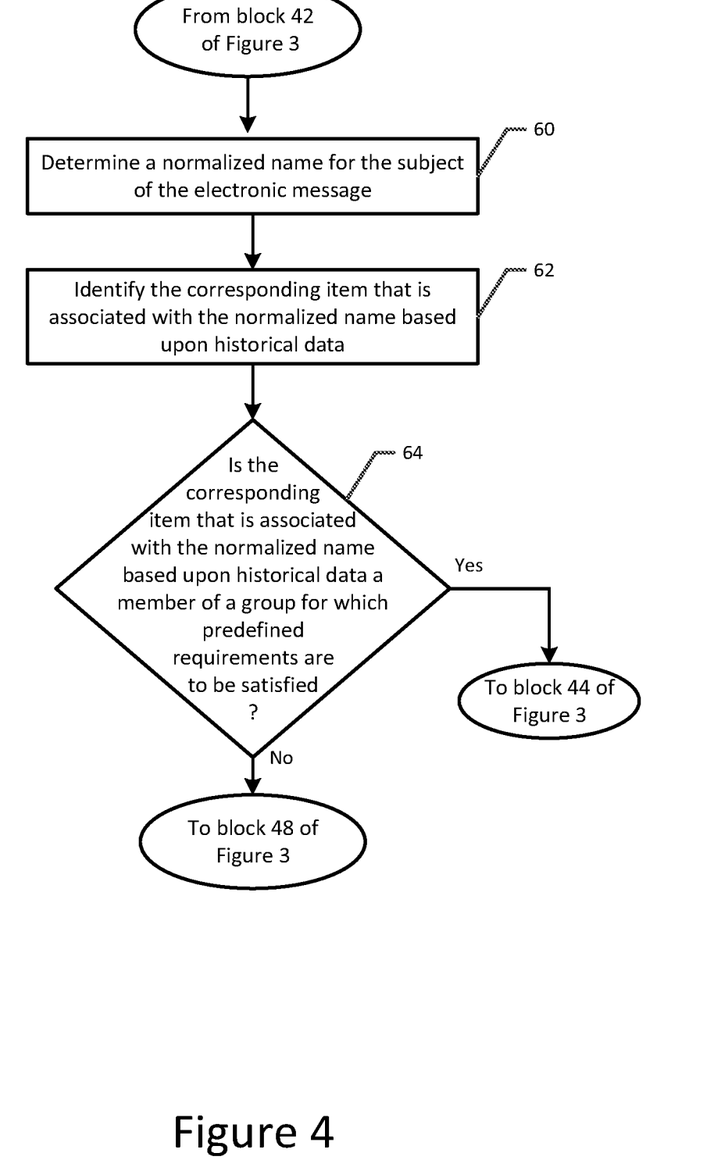
FIG. 4 is a flowchart illustrating the operations performed, such as by the switch of FIG. 1 embodied by the computing device of FIG. 2, in accordance with an example embodiment of the present invention in which the predefined requirements to be satisfied are determined based upon a normalized name for the subject of the electronic message.

Instead of generally determining whether the medication identified by a pharmacy benefit coverage request message is a member of a REMS group, the computing device 20, such as the processing circuitry 22, the processor 24, the group determination circuitry 32 or the like, may determine whether the particular formulation or brand of the medication to be dispensed by the pharmacy that will fill the prescription is a member of a REMS group. In this embodiment which is depicted in FIG. 4 and which flows from the YES branch of block 42 of FIG. 3, a particular formulation or brand of the medication to be dispensed by the pharmacy that will fill the prescription is initially identified and is then the subject of a comparison to determine if the particular formulation or brand of medication is a member of the REMS group. In this example embodiment, the computing device includes means, such as the processing circuitry, the processor, the group determination circuitry, the memory 26 or the like, for determining the normalized name for the subject of the electronic message. See block 60 of FIG. 4. For example, in an instance in which the electronic message identifies a medication by its NDC, the processing circuitry or the group determination circuitry is configured to identify the normalized name of the medication, such as by looking up the normalized name in a lookup table or other listing that associates the NDCs of different medications with their normalized names, such as an RxNorm. In this regard, the listing may be maintained, for example, in the memory for reference by the processing circuitry or the group determination circuitry.

In some instances, the normalized name may be associated with and be the normalized name for a plurality of different items, such as a number of different medications as identified by respective NDCs. By way of example, a single normalized name, e.g., RxNorm, may be associated with a plurality of different formulations and different brands of a medication, each of which is an item represented by an NDC and associated with the normalized name. In an example embodiment, the processing circuitry 22, such as the processor 24, or the group determination circuitry 32 is configured to determine whether the subject of the electronic message is a member of a group for which the predefined requirements are to be satisfied by identifying the corresponding item that is associated with the normalized name based upon historical data, such as may be stored by the memory 26 or the database system 30. See block 62 of FIG. 4. By way of example in which the electronic message is a prescription benefit coverage request message, the processing circuitry or the group determination circuitry is configured to identify the corresponding item that is associated with the normalized name based upon historical data by identifying the particular medication associated with the normalized name, e.g., RxNorm, that is likely to be used by the pharmacy to fill the prescription. In an instance in which the electronic message, such as the prescription benefit coverage request message identifies the pharmacy that the patient will utilize to fill the prescription, the processing circuitry or the group determination circuitry is configured to review historical data relating to medications dispensed by the pharmacy and to identify from among the items, that is, from among the medications, associated with the normalized name, e.g., the NDCs associated with the RxNorm, the medication that is most likely to be prescribed by the pharmacy, such as by identifying the medication associated with the normalized name that was most recently used by the pharmacy from among the various medications associated with the normalized name by the pharmacy or by identifying the medication from among those associated with the normalized name that is most frequently used by the pharmacy.

The processing circuitry 22, such as the processor 24, or the group determination circuitry 32 is then configured to determine whether the corresponding item that is associated with the normalized name based upon historical data is a member of a group for which predefined requirements are to be satisfied. See block 64 of FIG. 4. In this regard and continuing with the foregoing example, the processing circuitry or the group determination circuitry is then configured to determine whether the particular medication associated with the normalized name that is most likely to be used by the pharmacy to fill the prescription is a member of a REMS group.

In some embodiments, the electronic message will not identify the source of the item and, in these embodiments, the processing circuitry 22, e.g., the processor 24, or the group determination circuitry 32 is further configured to identify the source. Although the source may be identified in various manners, the source is identified in an example embodiment by randomly identifying the source from among sources that satisfy the predefined requirements. By way of example in which the source of the item is the pharmacy which will fill the prescription, a prescription benefit coverage request message may not identify the pharmacy at which the patient will fill the prescription. In this embodiment, the processing circuitry or the group determination circuitry is configured to randomly identify the pharmacy, such as from among the pharmacies that satisfy the predefined requirements, e.g., from among the pharmacies that satisfy the predefined REMS requirements. In an instance in which none of the pharmacies satisfy the predefined REMS requirements, a notification may be generated as described below indicating that the pharmacies fail to satisfy the predefined REMS requirements. However, in an instance in which a pharmacy is identified, either by the prescription benefit coverage request message or randomly from among the pharmacies that satisfy the predefined REMS requirements, the processing circuitry or the group determination circuitry may then identify the particular medication associated with the normalized name based upon historical data relating to the randomly identified pharmacy and, more particularly, the historical data identifying the medication from among those associated with a normalized name that is most likely to be used by the randomly identified pharmacy to fill the prescription, such as by being most recently used or most frequently used by the randomly identified pharmacy from among the medications associated with the normalized name. The processing circuitry, such as the processor, or the group determination circuitry may thereafter determine whether the particular medication is a member of a REMS group as described below.

Returning now to FIG. 3 with reference to block 44, in an instance in which the subject of the electronic message is a member of a group for which the predefined requirements are to be satisfied, the computing device 20 includes means, such as the processing circuitry 22, the processor 24, the requirement determination circuitry 34 or the like, for determining whether the predefined requirements are satisfied with respect to the subject of the electronic message. In an embodiment in which the electronic message is a prescription benefit coverage request message, the processing circuitry or the requirement determination circuitry is configured to determine whether the prescriber, the patient and the pharmacy that will fill the prescription have each satisfied the predefined requirements associated with the prescription of a REMS medication. In order to determine if the predefined requirements have been satisfied, the processing circuitry or the requirement determination circuitry may reference information, such as may be stored by memory 26, that indicates prescribers, pharmacies and patients who have satisfied the predefined requirements associated with the prescription of a REMS medication.

After having considered whether the predefined requirements have been satisfied with respect to the subject of the electronic message, the electronic message that is received by the service provider may be directed to any one of a plurality of different request processors depending upon the nature of the electronic message including, for example, the type of electronic message and/or information included within the electronic message identifying the request processor. Thus, based upon the analysis of the electronic message, the service provider formulates a related message that is directed to the appropriate request processor and that is constructed so as to satisfy the requirements of the request processor to which the related message is directed.

As shown in block 48 of FIG. 3, the computing device 20 includes means, such as the processing circuitry 22, the processor 24, the related message construction circuitry 36 or the like, for constructing a related message based upon information provided by the electronic message. The construction of the related message may involve the redirection of the electronic message to the appropriate request processor, such as determined based upon the electronic message, e.g., based upon the type of electronic message, based upon information within the electronic message indicating the request processor to which the related message is to be directed, etc. However, in other embodiments, the related message is constructed based upon information provided by the electronic message but in a different form than that provided by the electronic message, such as in a form that complies with the requirements of the request processor as defined, for example by a configuration predefined by the request processor. In an embodiment to which the electronic message is a prescription benefit coverage request message, the related message includes much of the same information provided by the prescription benefit coverage request message including an identification that the medication or other drug product (hereinafter referenced as a medication), such as the NDC of the medication or a normalized name, e.g., RxNorm, of the medication, information identifying the prescriber, information identifying the patient, such as the social security number or other patient identification number, information identifying the prescription insurance coverage associated with the patient, such as a benefit identification number (BIN), pharmacy control number (PCN), cardholder identification (ID) and/or group ID of the patient, information identifying the pharmacy to fill the prescription and drug pricing information, such as information regarding the drug cost, the usual and customary price, the dispensing fee, the gross amount due, the basis of cost determination and/or information regarding taxes. In other embodiments, the related message may include additional or different types of information than those provided above.

The computing device 20 also includes means, such as the processing circuitry 22, the processor 24 the communications interface 28 or the like, for causing related messages to be transmitted to the request processor 16. See block 50 of FIG. 3. The related message may be transmitted to a variety of different types of request processors depending upon the application. In an embodiment in which the electronic message is a prescription coverage request message, however, the request processor may be a pharmacy benefit manager, an insurance company or the like. The request processor is configured to receive and process the related message and to provide a response to the related message. As such, the computing device also includes means, such as the processing circuitry, the processor, the communications interface or the like, for receiving, based upon the related message, a response from the request processor. See block 52 of FIG. 3. A variety of different responses may be received depending upon the application. In an embodiment to which the electronic message is a prescription benefit coverage request message, the response from the request processor may provide prescription coverage information for the medication that was the subject of the electronic message in the event that the medication was subsequently prescribed to the patient identified by the electronic message. In an instance in which prescription coverage is provided, the response from the request processor may indicate that prescription coverage is provided and may provide related information regarding the extent of the covering including, for example, the patient pay amount, if any, for which patient will be responsible upon fulfillment of the prescription. In this regard, the patient pay amount is the sum of all patient payments. Alternatively, in an instance in which prescription coverage is not available or in which certain step(s) must be taken before the prescription coverage is approved, such as the provision of prior authorization, the response from the request processor may correspondingly indicate the unavailability of prescription coverage for the medication that was the subject of the electronic message or may indicate that additional step(s) must be taken prior to providing approval of the prescription coverage.

In instances in which coverage is indicated to be provided, a reversal request transaction may be constructed by the service provider 14 and transmitted to the request processor 16. The request processor may route the reversal request transaction so as to reverse the prescription coverage previously indicated to be provided. Thus, the service provider and, in turn, the source 12, such as the prescriber, is provided with information regarding the patient's prescription benefit coverage without causing the prescription coverage to, in fact, be provided as the source, such as the prescriber, the pharmacy, and/or the patient is generally gathering information in advance of writing the actual prescription which will subsequently be submitted for consideration in a conventional manner.

Based upon the response from the request processor 16, the computing device 20 includes means, such as the processing circuitry 22, the processor 24, the response construction circuitry 38 or the like, for constructing a response to the electronic message that is to be transmitted, such as to the source of the electronic message. See block 54 of FIG. 3. The response constructed by the computing device may be the same as the response from the request processor or may be based upon the response from the request processor so as to include information provided by the request processor along with additional information and/or a reformatting of the information. Depending upon the application, the response to the electronic message may provide a variety of different types of information. In relation to a telecommunications application, the response may provide information that facilitates the subsequent establishment of a telecommunications connection. In relation to content delivery and provisioning, the response to the electronic message may provide information sufficient to permit the requested content to be subsequently downloaded or streamed. In conjunction with a pharmacy benefit coverage request message, the response to the source may provide information outlining the prescription benefit coverage available to the patient and/or the patient pay information, such as the patient pay amount, in conjunction with a particular prescription that the prescriber is considering prescribing to the patient.

In an instance in which the predefined requirements are not satisfied with respect to the subject of the electronic message, the computing device 20 includes means, such as the processing circuitry 22, the processor 24, the response construction circuitry 38 or the like, for also causing a notification regarding the failure to satisfy the predefined requirements to be constructed for transmission in association with the aforementioned response, such as for transmission as a single message including both a response to the electronic message and the notification, such as to the source 12 of the electronic message. See block 46 of FIG. 3. In addition to simply identifying the failure to satisfy the predefined requirements, the notification may, in some embodiments, be constructed by the processing circuitry so as to include information regarding compliance measures to be taken to satisfy the predefined requirements. For example, the notification may identify for the prescriber those steps that are to be taken by the prescriber and/or the patient in order to satisfy the predefined requirements associated with the prescription of a REMS medication. As such, the prescriber and/or the patient may take the steps necessary to satisfy the predefined requirements in advance of the actual prescription for the REMS medication, thereby facilitating the patient's subsequent pick up of the prescription at the pharmacy and avoiding any delays otherwise brought about by the failure of the prescriber or the patient to satisfy in advance the predefined requirements associated with the REMS medication.

The computing device 20 also includes means, such as the processing circuitry 22, the processor 24, the communications interface 28 or the like, for causing the response to the electronic message and a notification, if any, regarding the failure to satisfy the predefined requirements to be transmitted, such as to the source 12 of the electronic message. See block 56 of FIG. 3. In some embodiments, the source of the electronic message is distinct from the source of the corresponding item. For example, the source of the electronic message may be a prescriber, while the source of the corresponding item may be the pharmacy. As shown in block 58 of FIG. 3, the historical data, electronic message, the related message, the response from the request processor 16, the response to the electronic message and/or the notification regarding the failure to satisfy the predefined requirements may all be stored, such as by the database system 30. For example, the different types of messages may be stored in different tables maintained by the database system.

Figure 5:
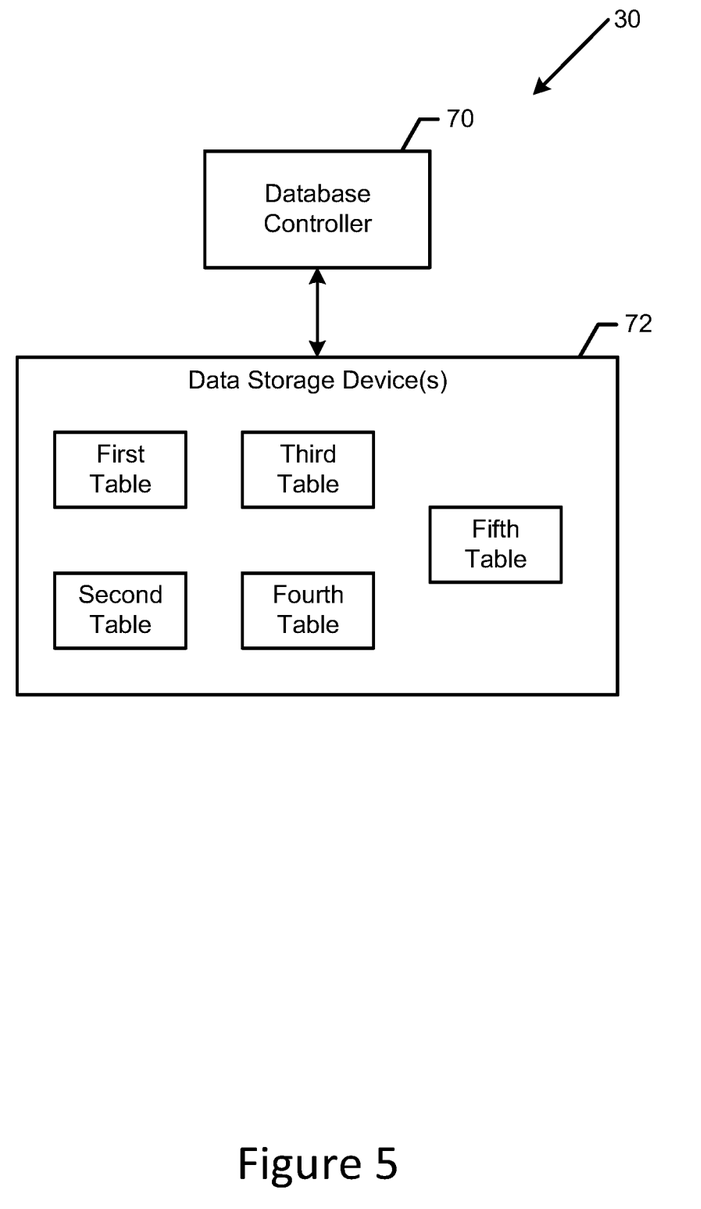
FIG. 5 is a block diagram of a database system that may be specifically configured in accordance with an example embodiment to the present invention.

With respect to the storage of the various messages, the database system 30 may be configured in various manners including as shown in FIG. 5 in accordance with an example embodiment. In this embodiment, the database system includes one or more data storage devices 72 and a database controller 70 configured to store messages in respective tables defined within the one or more data storage devices. The data storage devices may be embodied by any of a variety of different memory devices including NAS, one or more servers or the like. Although the database controller may also be embodied in various manners, the database controller of one embodiment is embodied by the processing circuitry 22, such as the processor 24. Alternatively, the database controller be discrete circuitry, separate from, but in communication with, the processing circuitry. In this alternative embodiment, the database controller may be embodied in any of the various manners described above with respect to the processor including embodiments comprised exclusively of hardware or embodiments in which the execution of software by hardware serves to specifically configure the hardware to perform the functions of the database controller.

The database controller 70 is configured to store messages in respective tables defined within the one or more data storage devices 72, such as by partitioning the data storage device(s) so as to define a plurality of tables. As such, the database controller may be configured to store in a first table electronic messages that are received via a communication interface. The database controller of this embodiment is configured to store in a second table related messages transmitted by the communication interface to a request processor. Each related message is based upon information provided by a respective electronic message. The database controller of this embodiment is also configured to store in a third table responses from the request processor to the related messages. In this embodiment, the database controller is further configured to store in a fourth table responses to the electronic messages that are based upon the responses from the request processor and that are transmitted by the communication interface. In addition, the database controller of this example embodiment may be configured to store in a fifth table notifications transmitted by the communication interface in association with respective responses to the electronic messages, each notification identifying an instance in which: (i) a subject of a respective electronic message is a member of a group for which predefined requirements are to be satisfied and (ii) a failure to satisfy the predefined requirements has been determined. For example, one or more of the notifications stored by the database controller in the fifth table may include information regarding compliance measures to be taken to satisfy the predefined requirements.

Although primarily described herein in conjunction with the issuance of a prescription benefit coverage request message by a prescriber, the prescription benefit coverage request message may, instead, be issued by a pharmacy, such as via a pharmacy management system, and/or by a patient, such as via a website, portal or other on-line tool provided by a pharmacy which permits entry by the patient of the information that will form the prescription benefit coverage request message following processing by the pharmacy management system. In this regard, the prescription benefit coverage request message may identify the patient as well as the medication and the prescriber. For example, the information regarding the medication and the prescriber may be provided by scanning in the prescription from the prescriber, requesting refill information or otherwise providing the name of the medication and the prescriber. As to the information identifying the patient, the prescription benefit coverage request message may be linked by the pharmacy management system to a profile of the patient which, among other things, provides benefit coverage information associated with the patient. The pharmacy management system may also add additional information including the NDC of the medication and drug pricing information including by way of example but not of limitation one or more of the drug cost, the usual and customary price, the dispensing fee, ingredient cost, the gross amount due, the basis of cost determination and information regarding taxes.

The resulting electronic message, e.g., the prescription benefit coverage request message, including the information associated with a prescriber, the patient and the patient's prescription benefit information, the medication and the drug pricing information may be formatted in a predefined manner, such as defined by the request processor 16 to which the message will be submitted. Thereafter, the request processor may process the prescription benefit coverage request message and return a response providing information regarding the prescription coverage for the medication for the patient including the availability of coverage and, if so, the patient pay amount, if any, for which the patient will be responsible. The pharmacy management system may receive the response from the request processor and may provide the response or at least some of the information conveyed by the response to the patient so that the patient will be informed as to the availability of prescription coverage and the patient pay amount that will be required. In parallel with the return of the response from the request processor, a reversal request transaction may be constructed by the service provider 14 and transmitted to the request processor. The request processor may route the reversal request transaction so as to reverse the prescription coverage previously indicated to be provided, as described above.

A prescription benefit coverage request message issued by a pharmacy may be evaluated as described above to determine if the subject of the electronic message, such as the medication as defined, for example, by an NDC, is a member of a group, such as a REMS group, for which predefined requirements are to be satisfied and, if so, to cause a notification to be constructed and transmitted in an instance in which the predefined requirements have not been satisfied. In other embodiments, however, the prescription benefit coverage request message issued by a pharmacy need not be evaluated in this manner and, instead, the receipt and analysis of a prescription benefit coverage request message issued by a pharmacy may trigger the construction and transmission of a related message to a request processor 16. Based upon the response from the request processor which may provide information outlining the prescription benefit coverage available to the patient and/or the patient pay information, such as the patient pay amount, in conjunction with a particular prescription that is referenced by the prescription benefit coverage request message, a response to the prescription benefit coverage request message may be constructed and transmitted, such as to the pharmacy, in order to provide the information relating to the prescription benefit coverage to the pharmacy and/or the patient. In this embodiment, the computing device 20 and method may proceed as shown in FIG. 3, albeit without the operations depicted by blocks 42, 44 and 46 and also without transmission of a notification as depicted by block 56. Instead, the computing device and method may proceed directly from the receipt of the electronic message depicted by block 40 to the construction of a related message as depicted by block 48 prior to performing the operations depicted by blocks 50-58, albeit without the transmission of a notification as noted above.

As noted above, FIGS. 3 and 4 are flowcharts illustrating the operations performed by a method, apparatus and computer program product, such as computing device 20 of FIG. 2, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of a computing device employing an embodiment of the present invention and executed by a processor 24 of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 4, when executed, convert a computer or processing circuitry into a particular machine configured to perform an example embodiment of the present invention. Accordingly, the operations of FIGS. 3 and 4 define an algorithm for configuring a computer or processing circuitry, e.g., processor, to perform an example embodiment. In some cases, a general purpose computer may be provided with an instance of the processor which performs the algorithm of FIGS. 3 and 4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A database system comprising:
   one or more data storage devices; and
   a database controller configured to store messages in respective tables defined within the one or more data storage devices,
   wherein the database controller is configured to store in a first table electronic messages that are received via a communication interface;
   wherein the database controller is configured to store in a second table related messages transmitted by the communication interface to a request processor, wherein each related message is based upon information provided by a respective electronic message and in accordance with a configuration predefined by the request processor;
   wherein the database controller is configured to store in a third table responses from the request processor to the related messages;
   wherein the database controller is configured to store in a fourth table responses to the electronic messages that are based upon the responses from the request processor and that are transmitted by the communication interface; and
   wherein the database controller is configured to store in a fifth table notifications transmitted by the communication interface in association with respective responses to the electronic messages, each notification identifying an instance in which: (i) a medication of a respective electronic message is a member of a group for which predefined prescription requirements are to be satisfied and (ii) a failure to satisfy the predefined prescription requirements has been determined.

2. The database system according to claim 1 wherein one or more of the notifications stored by the database controller in the fifth table includes information regarding compliance measures to be taken to satisfy the predefined requirements.

3. A computing device configured to analyze an electronic message and to determine whether predefined prescription requirements are satisfied with respect to a medication of the electronic message, the computing device comprising:
   a communication interface configured to receive the electronic message;
   group determination circuitry configured to analyze a field of the electronic message to determine whether the medication of the electronic message is a member of a group for which the predefined prescription requirements are to be satisfied;
   requirement determination circuitry configured to, in an instance in which the medication of the electronic message is a member of a group for which the predefined prescription requirements are to be satisfied, determine whether the predefined prescription requirements are satisfied with respect to the medication of the electronic message;
   related message construction circuitry configured to construct a related message in accordance with a configuration predefined by a request processor and based upon information provided by the electronic message for transmission by the communication interface to the request processor;
   response construction circuitry configured to construct, based upon a response from the request processor, a response to the electronic message that is to be transmitted by the communication interface and, in an instance in which the predefined prescription requirements are not satisfied, to cause a notification regarding a failure to satisfy the predefined prescription requirements to also be constructed for transmission by the communication interface in association with the response; and
   a database configured to store one or more of the electronic message, the related message, the response from the request processor, the response to the electronic message or the notification regarding a failure to satisfy the predefined prescription requirements.

4. The computing device according to claim 3 wherein the group determination circuitry is configured to determine whether the medication of the electronic message is a member of a group for which the predefined prescription requirements are to be satisfied by determining a normalized name for the medication of the electronic message, wherein one or more items including the medication of the electronic message are associated with the normalized name.

5. The computing device according to claim 4 wherein the group determination circuitry is further configured to determine whether the medication of the electronic message is a member of a group for which the predefined prescription requirements are to be satisfied by identifying the corresponding item that is associated with the normalized name based upon historical data.

6. The computing device according to claim 5 wherein the group determination circuitry is further configured to determine whether the medication of the electronic message is a member of a group for which the predefined prescription requirements are to be satisfied by determining whether the corresponding item that is associated with the normalized name based upon historical data is a member of a group for which the predefined prescription requirements are to be satisfied.

7. The computing device according to claim 5 wherein, in an instance in which the electronic message does not identify a source of the corresponding item, the group determination circuitry is further configured to randomly identify the source from among sources that satisfy the predefined prescription requirements.

8. The computing device according to claim 7 wherein the communication interface is further configured to cause the response to the electronic message and the notification to be transmitted to a source of the electronic message, which is distinct from the source of the corresponding item.

9. The computing device according to claim 3 wherein the response construction circuitry is configured to cause a notification regarding a failure to satisfy the predefined prescription requirements to also be constructed by including information within the notification regarding compliance measures to be taken to satisfy the predefined prescription requirements.

10. A method for analyzing an electronic message and determining whether predefined prescription requirements are satisfied with respect to a medication of the electronic message, the method comprising:

receiving the electronic message via a communication interface;

analyzing, with group determination circuitry, a field of the electronic message to determine whether the medication of the electronic message is a member of a group for which the predefined prescription requirements are to be satisfied;

in an instance in which the subject of the electronic message is a member of a group for which the predefined prescription requirements are to be satisfied, determining, with requirements determination circuitry, whether the predefined prescription requirements are satisfied with respect to the medication of the electronic message;

constructing, with related message construction circuitry, a related message in accordance with a configuration predefined by a request processor and based upon information provided by the electronic message;

causing the related message to be transmitted by the communication interface to the request processor;

based upon the related message, receiving a response via the communication interface from the request processor;

based upon the response from the request processor, constructing, with response construction circuitry, a response to the electronic message that is to be transmitted by the communication interface and, in an instance in which the predefined prescription requirements are not satisfied, cause a notification regarding a failure to satisfy the predefined prescription requirements to also be constructed for transmission by the communication interface in association with the response; and storing, in a database, one or more of the electronic message, the related message, the response from the request processor, the response to the electronic message or the notification regarding a failure to satisfy the predefined prescription requirements.

11. The method according to claim 10 wherein determining, with the group determination circuitry, whether the medication of the electronic message is a member of a group for which the predefined prescription requirements are to be satisfied comprises determining, with the group determination circuitry, a normalized name for the medication of the electronic message, wherein one or more corresponding items including the medication of the electronic message are associated with the normalized name.

12. The method according to claim 11 wherein determining, with the group determination circuitry, whether the medication of the electronic message is a member of a group for which the predefined prescription requirements are to be satisfied comprises identifying, with the group determination circuitry, the corresponding item that is associated with the normalized name based upon historical data.

13. The method according to claim 12 wherein determining, with the group determination circuitry, whether the medication of the electronic message is a member of a group for which the predefined prescription requirements are to be satisfied further comprises determining, with the group determination circuitry, whether the corresponding item that is associated with the normalized name based upon historical data is a member of a group for which the predefined prescription requirements are to be satisfied.

14. The method according to claim 12 further comprising, in an instance in which the electronic message does not identify a source of the corresponding item, randomly identifying, with the group determination circuitry, the source from among sources that satisfy the predefined prescription requirements.

15. The method according to claim 14 further comprising causing the response to the electronic message and the notification to be transmitted by the communication interface to a source of the electronic message, which is distinct from the source of the corresponding item.

16. The method according to claim 10 wherein causing a notification regarding a failure to satisfy the predefined prescription requirements to also be constructed by the response construction circuitry comprises including information within the notification regarding compliance measures to be taken to satisfy the predefined prescription requirements.

* * * * *